United States Patent

Stratigos et al.

[11] Patent Number: 5,537,486
[45] Date of Patent: Jul. 16, 1996

[54] HIGH-SPEED DOCUMENT VERIFICATION SYSTEM

[75] Inventors: William N. Stratigos, New York; Stephen R. Landau, Forest Hills, both of N.Y.

[73] Assignees: Empire Blue Cross/Blue Shield; Sigma Imaging Systems, Inc., both of New York, N.Y.

[21] Appl. No.: 612,557

[22] Filed: Nov. 13, 1990

[51] Int. Cl.$^6$ ............ G06K 9/00; G06K 9/03; B42D 15/00; G07D 7/00
[52] U.S. Cl. ............ 382/137; 382/135; 382/309; 283/70; 902/7
[58] Field of Search .............. 382/7, 48, 57, 382/50, 1, 12; 283/70, 92, 58, 94, 95; 428/195, 915, 916; 209/582, 534; 194/206; 902/7; 364/408

[56] References Cited

U.S. PATENT DOCUMENTS

| | | | |
|---|---|---|---|
| 3,246,297 | 4/1966 | Silverstein | 382/7 |
| 3,782,543 | 1/1974 | Martelli et al. | 209/534 |
| 4,175,774 | 11/1979 | Tonges et al. | 283/58 |
| 4,227,719 | 10/1980 | McElligott et al. | 283/58 |
| 4,296,326 | 10/1981 | Haslop et al. | 250/372 |
| 4,325,981 | 4/1982 | Suguira et al. | 283/70 |
| 4,455,039 | 6/1984 | Weitzen et al. | 283/83 |
| 4,584,703 | 4/1986 | Hallberg | 382/50 |
| 4,588,292 | 5/1986 | Collins | 209/534 |
| 4,710,963 | 12/1987 | Chapman et al. | 209/534 |
| 4,722,444 | 2/1988 | Murphy et al. | 382/7 |
| 4,723,072 | 2/1988 | Naruse | 209/534 |
| 4,881,268 | 11/1989 | Uchida et al. | 382/7 |
| 4,914,709 | 4/1990 | Rudak | 382/57 |
| 4,952,551 | 8/1990 | Buehler | 428/195 |

FOREIGN PATENT DOCUMENTS

| | | | |
|---|---|---|---|
| 0251237 | 1/1988 | European Pat. Off. | H04N 1/21 |
| 0377167 | 7/1990 | European Pat. Off. | D21H 21/48 |
| 0381550 | 8/1990 | France | G07D 7/00 |
| 8103509 | 12/1981 | WIPO | D21H 5/10 |

OTHER PUBLICATIONS

Patent Abstracts of Japan, vol. 9, No. 212 (E–339), 29 Aug. 1985 & JP-A-60 074 842 (Toshiba KK), 27 Apr. 1985.
Patent Abstracts of Japan, vol. 8, No. 167 (E–258), 2 Aug. 1984 & JP-A-59 064 956 (Ricoh KK), 13 Apr. 1984.

*Primary Examiner*—Jose L. Couso
*Assistant Examiner*—Matthew C. Bella
*Attorney, Agent, or Firm*—Darby & Darby

[57] ABSTRACT

A high-speed document verification system includes a document which is printed with a pattern having a predetermined arrangement of different reflectivity due to varying densities, line resolutions, or fluorescence. The arrangement represents information about the document. The document is fed into a high-speed document scanner sensitive to the varying ink densities or line resolutions. A graphic image of the document is produced by the scanner and this image or a graphic file of the image is checked to see if the proper pattern exists. A comparison unit, such as an optical character recognition system may be used to compare the scanned document's image with known density arrangements of valid documents to determine what information, if any, is represented by the arrangement. The graphic image may be sent to an operator's work station to be visually checked rather than being compared by the comparison unit or the image may be sent to the operator after it has been rejected by the comparison unit.

25 Claims, 1 Drawing Sheet

FIG. 1
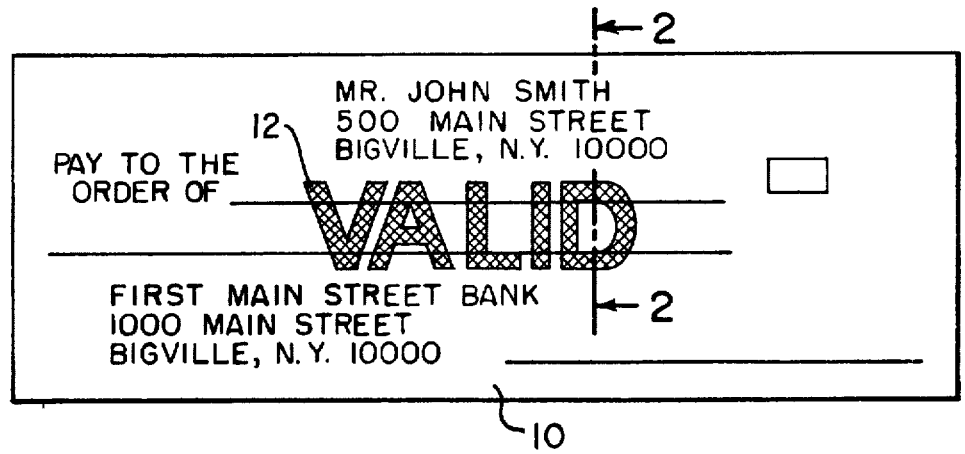
FIG. 2a
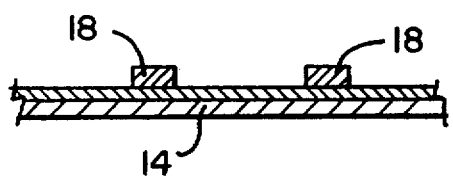
FIG. 2b
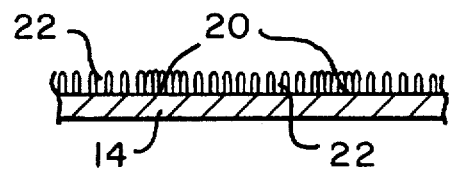
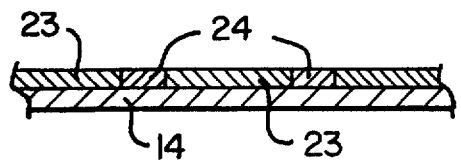
FIG. 2c
FIG. 3
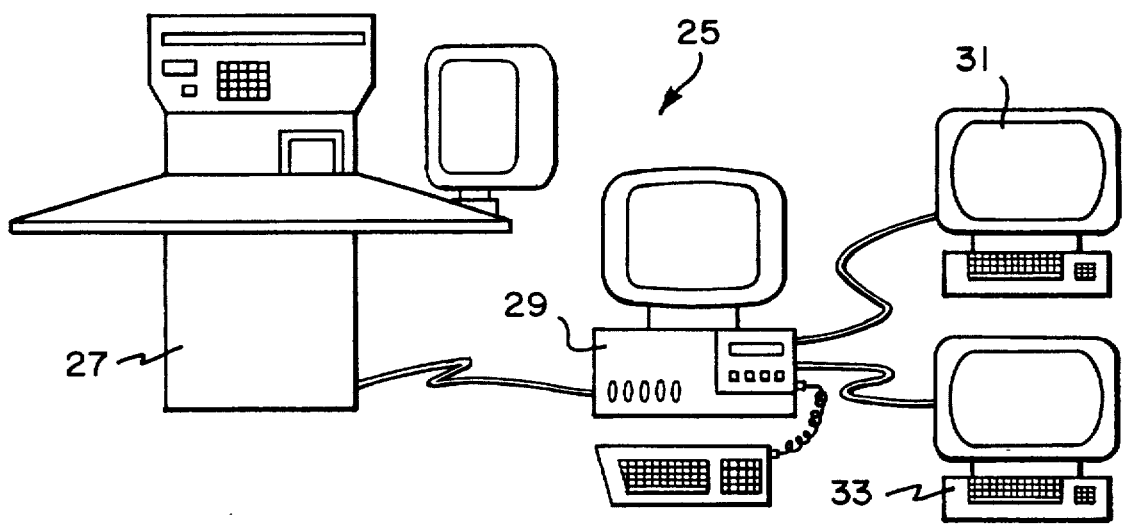

HIGH-SPEED DOCUMENT VERIFICATION SYSTEM

BACKGROUND OF THE INVENTION

This invention relates to an automatic high-speed document verification system and, more particularly, to a document verification system which utilizes optical scanning techniques to detect subtle variations in patterns printed on documents.

Checks, stocks, bonds and the like are often encoded to assure that they are valid documents and not fakes or photocopies. Prior art verification schemes include printing a message, such as "void", on the document with ink visible only under ultraviolet light. Another verification system involves printing a pattern on the document. This pattern includes lines of varying widths. Although the pattern looks continuous to the human eye, a photocopier cannot detect the thinner lines of the pattern. If the lines are properly arranged, a photocopy of an invalid document will have a blank portion which may be in the shape of word, e.g., "void", or an icon.

Both of these prior art systems are currently produced by Moore Business Forms. These systems are manual and therefore require a prohibitive amount of time to verify a large number of documents. For example, the photocopying system requires that each document be copied and the copies visually inspected. Because of this time constraint, the documents (for instance checks) cannot be verified until after they have already been honored because it would take too long for each document to be verified prior to honoring it. Thus, the prior art verification systems can only be used as an internal control to ensure the validity of documents after they have already been honored.

High speed check handling equipment is also known in the art; for instance U.S. Pat. No. 4,523,330 to Cain and the UNISYS Reader Sorter DT. These devices create a video image of each check to be processed. The data on the check's image may then be forwarded to an operator to verify payment.

SUMMARY OF THE INVENTION

The present invention is directed to an automatic high-speed document verification system in which the validity of the document is checked by the differential response of an optical scanner to subtle variations in the reflectivity of a pattern printed on the check. These variations may be, e.g., in the width of lines in the pattern (resolution), density or fluorescence of the ink forming the pattern at different parts of the document.

In an illustrative embodiment of the invention, the document is printed with ink of varying reflectivities caused by differences in resolution, densities or fluorescence. The system comprises a high-speed document scanning device which creates a graphic image of the documents to be verified. Although the difference in ink reflectivity may be invisible to the human eye, the scanner can distinguish the difference in reflectivity, such that the video image has large differences in intensity.

The graphic image is sent to a comparison unit which is programmed to compare the graphic image to known valid document images. It may, for example, compare the ink densities of two specific portions of the document, or detect whether a hidden icon in the pattern is revealed in the video image. An operator may receive the graphic image either (1) as an alternative to the comparison unit (i.e., the operator visually verifies the document's validity by observing the image), or (2) to investigate a document which was found by the comparison unit to be invalid (i.e., a suspected fake).

The verification process of the present invention can be performed rapidly and can take place before the document is honored. Thus, the problems associated with the prior art systems are avoided. The present invention may also be used to detect forged currency.

In practicing the present invention, a check or other document that may later need to be verified for authenticity may be printed with ink of varying density in a number of ways. For example, the higher density areas can receive two or more applications of ink, while the lower density area receives only a single application of ink. Another method is to apply the ink in a dot pattern, with a varying amount of dots per unit area. A third method is to apply ink containing optically inert fillers or densifiers to create areas of higher density. The pattern of low and high density areas is arranged so that it can be detected by the scanner and recognized by the comparison unit, but is essentially invisible to the human eye.

Alternatively, the reflectivity can be varied between portions of the document by coating one portion with ink having fluorescent material. In such a case, the document is illuminated with ultraviolet or "black light" during the scanning process. This greatly enhances the difference in reflectivity between the portions.

The document is fed into a high-speed check handling device such as the UNISYS Reader Sorter DT, where an electronic video image of the document is prepared. This image will represent the ink densities or display the icon, such as a blank area caused by the lower density ink, or some other recognizable pattern regarding information about the document. The operator or comparison unit receiving this image may now detect an invalid document before it is honored.

BRIEF DESCRIPTION OF THE DRAWINGS

The foregoing and other features of the present invention will be more readily apparent from the following detailed description and drawings of an illustrative embodiment of the invention in which:

FIG. 1 is a document according to the present invention, with the low density areas marked by cross hatching;

FIGS. 2a, 2b and 2c are cross sectional views of three embodiments of the present invention taken along line 2—2 of FIG. 1; and FIG. 3 is a front view of an automatic high-speed document verification system according to the present invention.

BRIEF DESCRIPTION OF THE PREFERRED EMBODIMENT

FIG. 1 shows a document printed in accordance with the present invention. A check 10, as shown here, or any document which may require verification, is printed so that a predetermined pattern or icon has a higher reflectivity (e.g., due to higher density ink, fluorescent inks or lower resolution lines) than the remainder of the document. Here, the higher density portion 12 is shown in the cross hatched portion which reads "valid". It should be clear that variation in densities need not and should not be visible to the human eye, and that FIG. 1 shows this area merely to illustrate the invention. Further, the density variation need not be a word as shown, but could be an icon or merely a specified area of denser (or less dense) ink or higher resolution lines.

When density is used to create the detected variation, the variation in density may be created in any convenient manner. One way to create this variation is to apply additional coats of ink (or other suitable print) over the areas designated as "high density." This is shown in FIG. 2a, wherein the paper 14 is coated with a first layer of ink 16 and then with a second layer of ink 18 inside the high density area defined by the shape of the letter "D". It should be understood that any suitable number of coats may be used.

A way of creating the high density area on a document printed with a dot pattern is to print the high density areas with more dots per unit area than the less dense portion. This is seen in FIG. 2b, wherein the paper 14 is coated with a dot pattern of many dots per unit area 20, except within the low density area 12, where there is a dot pattern of fewer dots per unit area 22.

A third way of creating the variation between high and low density portions is to coat the denser portions with ink containing optically inert fillers. Such fillers include calcium carbonate and clay-based fillers such as kaolin. FIG. 2c shows the paper 14 having a coating of less dense ink 23 and an area of higher density ink having the optically inert fillers 24.

FIG. 3 shows an automatic high-speed document verification system according to the present invention. The system 25 comprises a high speed document scanner 27, a comparison unit 29, an investigative work station 31 and a data entry work station 33.

The documents to be verified are fed into the high-speed scanner 27, which has resolution and density discrimination capabilities. The IBM 3898 Image Processor and the UNISYS Reader Sorter DT series have these capabilities. The Reader Sorter Models 1800 and 1200 scan checks at a rate of 1800 and 1200 per minute, respectively. These scanners can distinguish, e.g., densities for Pantone PMS Blue 315 ink in the range of 0.50 to 0.66 as measured on a Densitometer Model 408, produced by X-Rite, Inc.

The scanner 27 shines a light on the document and the light reflected off of the document is received by a charge-coupled device. Each element of the charged-coupled device is either on or off in response to the amount of light it receives. The denser ink causes a higher densitometer reading. In other words, the denser ink reflects more light, causing a higher number of charge-coupled elements to be activated. The same is true of high resolution lines. In particular, the narrower, high resolution lines reflect more light than the wider, low resolution lines. The information from the charge-coupled elements is stored in a memory called a "graphics image file."

If a portion of the document is coated with an ink having fluorescent properties, the area having the fluorescent ink can readily be detected. The scanner for such a document must shine an ultraviolet or "black light" on the document during the scanning process in order for the pattern to appear on the "graphics image file."

The graphics image file is sent to the comparison unit 29. The comparison unit 29 is programmed to search the graphic image, or a particular portion thereof, to compare the densities of at least two specific portions of the document to determine whether the appropriate reflectivity pattern or icon 12 is present. The comparison unit 29 can then determine whether or not the proper markings are present on the document. If icons or other alphanumeric markings are encrypted in the pattern, an optical character recognition system may be used as the comparison unit. The comparison unit may compare by determining the density in a first part of the graphic image, determining the density in a second part of the graphic image, comparing the ratio of density in the first and second parts, and comparing the ratio to a predetermined value. With respect to this comparison, the differences in density signify information regarding validity of a document. Such differences may not be readily detected by the human eye but are readily detected in the electronic graphic image of the optical scanner.

The image of documents determined not to have the proper markings, and which are suspected as fakes, are then sent to an investigative station 31 to be manually confirmed. The properly marked documents are sent to a data entry work station 33. Alternatively, the graphics image file may be directly sent to the data entry work station 33, where the document can be visually checked for the proper pattern or icon 12.

Although FIG. 3 shows the system as having three distinct components, it should be understood that the invention may be a single component or any combination of components as is practical for a given application. Further, this disclosure has only mentioned the verification of documents but it could be equally effective in detecting forged currency or any other printed matter.

The pattern or icon 12 may be invisible to the human eye or be only barely visible. However, the image scanner 27 may reproduce the high density portion but delete the low density portion. The scanner 27 may also be programmed so that it produces various shades of gray in response to different reflectivities (e.g., due to differences in density, resolution or fluorescence). The document 10 may be printed so that the graphic image reveals the word "valid" or the location of areas having particular densities or line resolution may be compared in order to verify the validity of the document before it is honored. Further, the icons or patterns 12 can be varied from document to document so that unique codes may be associated with a particular document or customer. This increases the accuracy of the verification process. Thus, the comparison unit 29 can be programmed to identify any number of markings, making it possible to store many "messages" on a single document 10. More complicated markings will require the use of an Optical Character Recognition system as the comparison unit 29.

The system described above may be attached to the high-speed check scanners already known in the art, such as the UNISYS Reader Sorter DT or IBM 3898 Image Processor. Checks may be specially coded and the comparison unit would be programmed to search the graphics file of these scanners for the relevant data to verify the checks. This is particularly useful for large institutions which write a large number of checks.

As an alternative, where speed is not essential and the volume is low, a small manual scanner may be used to create a video image or graphics file of the document which is checked by a program, e.g., stored in a personal computer. If a video display terminal is provided, the comparison unit 29 may be eliminated and the document verified by an operator viewing the screen.

While the present invention has been particularly shown and described with reference to preferred embodiments thereof, it is understood by those skilled in the art that various changes in the form and details may be made therein without departing from the spirit and scope of the invention. In particular, rather than a variation in the density of the ink, the patterns recognized on a video image of the document may be due to the resolution limitations of the scanner in conjunction with reduced width and close spacing of the pattern lines in certain areas. Also, while the invention has been described with reference to a scanner that relies on reflectivity of the printed document, other variations, e.g., light transmission, transparency, etc. may be used to carry out the invention.

What is claimed is:

1. A document verification system for use with a document having at least a portion thereof printed with a predetermined pattern of areas having differences that are not readily detected by the human eye but are readily detected by an optical scanner, wherein the differences represent information regarding validity of the document, comprising:
    means for scanning an entirety of a face of the document and for producing an electronic graphic image indicative of the entirety of the face of the document as scanned, said electronic graphic image containing said predetermined pattern such that said differences are apparent in said electronic graphic image; and
    means for detecting a presence and an absence of the differences contained in said electronic graphic image by comparing a density in one area of the graphic image to that in another area of the graphic image, the presence being an indication of the validity of the document, said detecting means including means for searching said electronic graphic image to locate the one area and the another area for purposes of effecting the comparing.

2. The verification system of claim 1, wherein said comparing means includes an optical character recognition system.

3. The verification system of claim 1, wherein the differences in the pattern are differences in the resolution of lines in the pattern.

4. The verification system of claim 1, wherein the density varies due to ink having optically inert fillers.

5. The verification system of claim 4, wherein the optically inert fillers are selected from the group consisting essentially of calcium carbonate and clay-based fillers.

6. The verification system of claim 1, wherein the differences in the area are differences in the fluorescence of the pattern.

7. The verification system of claim 1, wherein the comparing means includes a character recognition means for comparing a formulation in the graphic image to a predetermined character.

8. A process useful in document verification, comprising the steps of:
    a. printing at least one valid document with at least a portion thereof having a pattern with a predetermined arrangement of areas having differences in density that are not readily detected by the human eye but are readily detected by an optical scanner, said arrangement representing information regarding validity of a document;
    b. scanning an entirety of a face of an unverified document in a high-speed document scanner to produce an electronic graphic image indicative of the entirety of the face of the unverified document as scanned;
    c. searching said electronic graphic image to find first and second portions of said electronic graphic image; and
    d. comparing the first and second portions of said electronic graphic image to said predetermined arrangement of differences to determine if the arrangement is present which would be an indication of the validity of the document, the comparing involving the steps of determining a density in the first portion of the graphic image, determining a density in the second portion of the graphic image, and comparing a ratio of density in the first and second portions to a predetermined value.

9. The process of claim 8, wherein the differences include differences in resolution of the lines in the pattern.

10. The process of claim 8, wherein the density differences are due to ink having optically inert fillers.

11. The process of claim 10, wherein the optically inert fillers are selected from the group consisting essentially of calcium carbonate and clay-based fillers.

12. The process of claim 8, wherein the differences include differences in fluorescence.

13. The process of claim 8, wherein said step of printing comprises applying additional coats of print to the areas having a higher density.

14. The process of claim 8, wherein said step of printing comprises applying print to paper in dot patterns, the areas including those of higher density which have more dots per unit area in the dot patterns than that for the areas which are of lower density.

15. The process of claim 8, wherein the step of comparing is performed by a comparison unit programmed to detect the presence and absence of the predetermined arrangement in said graphic image.

16. The process of claim 8, wherein the step of comparing involves the steps of selecting a part of the graphic image and utilizing an optical character recognition means to determine if a predetermined character is present in that part.

17. A process for automatic verification of documents having a pattern with a predetermined arrangement of areas having differences in print density that are not readily detected by the human eye, but are readily detected by an optical scanner, the differences representing information regarding validity of a document, comprising the steps of:
    a. scanning an entirety of a face of an unverified document with an optical document scanner;
    b. producing an electronic graphic image indicative of the entirety of the face of the unverified document as scanned including print densities of said unverified document;
    c. searching said electronic graphic image to find first and second portions of said electronic graphic image; and
    d. comparing a print density in one portion of the graphic image to that in another portion of the graphic image and determining a presence and an absence of the differences based on the comparing which thereby signifies an indication of the validity of the document.

18. The process of claim 17, wherein the step of comparing is performed by a comparison unit programmed to detect the presence and absence of the predetermined arrangement of areas having differences in graphic image.

19. The process of claim 17, wherein the differences include differences in the resolution of lines in the pattern.

20. The process of claim 17, wherein the density varies due to ink having optically inert fillers.

21. The process of claim 20, wherein the optically inert fillers are selected from the group of calcium carbonate and clay-based fillers.

22. The process of claim 17, wherein the differences are differences in fluorescence.

23. The process of claim 17, wherein the comparing step involves the steps of selecting a part of the graphic image and utilizing an optical character recognition means to determine if a predetermined character is present in that part.

24. The process of claim 17 further including the steps of:

producing an invalid document indication where the electronic graphic image varies substantially from said predetermined arrangement of differences; and routing the electronic graphic image to an operator display terminal when such invalid document indicated is produced; and having the electronic graphic image inspected by an operator.

25. A system useful in verification of documents having at least a portion thereof printed with a predetermined pattern of areas with differences that are not readily detected by the human eye, but are readily detected by an optical scanner, wherein the differences represent information regarding validity of the document, comprising:

means for scanning an entirety of a face of a document and for producing an electronic image indicative of the entirety of the face of the document as scanned; and means for determining the validity of the scanned document with a comparison unit which detects a presence and an absence of the differences in the electronic image by comparing a density in one portion of the graphic image to that in another portion of the graphic image, said determining means including means for searching said electronic graphic image to locate the one portion and the another portion for purposes of effecting the comparing.

* * * * *